United States Patent [19]

Kuroda et al.

[11] Patent Number: 6,028,834
[45] Date of Patent: Feb. 22, 2000

[54] METHOD FOR RECORDING TEST DATA ON RECORDING MEDIUM

[75] Inventors: Kazuo Kuroda; Akiyoshi Inoue; Shoji Taniguchi, all of Saitama-ken, Japan

[73] Assignee: Pioneer Electronic Corporation, Tokyo, Japan

[21] Appl. No.: 09/099,214

[22] Filed: Jun. 18, 1998

Related U.S. Application Data

[62] Division of application No. 08/697,352, Aug. 22, 1996.

[30] Foreign Application Priority Data

Aug. 25, 1995 [JP] Japan .................................. 7-240621

[51] Int. Cl.[7] ...................................................... G11B 7/00
[52] U.S. Cl. ............................................. 369/116; 369/58
[58] Field of Search ................................ 369/54, 58, 116, 369/44.26, 44.27, 47, 48, 32

[56] References Cited

U.S. PATENT DOCUMENTS

| 5,226,027 | 7/1993 | Bakx ........................................... 369/58 |
| 5,341,360 | 8/1994 | Johann et al. ........................... 369/116 |
| 5,463,600 | 10/1995 | Kirino et al. .............................. 369/13 |
| 5,513,165 | 4/1996 | Ide et al. .................................. 369/116 |
| 5,617,399 | 4/1997 | Spruit et al. ............................. 369/116 |

*Primary Examiner*—Paul W. Huber
*Attorney, Agent, or Firm*—Morgan, Lewis & Bockius LLP

[57] ABSTRACT

A power calibration area is provided for obtaining an optimum recording power and a first information recording area is provided after the power calibration area. A test recording area is formed after the first information recording area for obtaining an optimum recording power for recording information in a next information recording area.

10 Claims, 6 Drawing Sheets

PRIOR ART

METHOD FOR RECORDING TEST DATA ON RECORDING MEDIUM

This is a divisional of copending application Ser. No. 08/697,352, filed on Aug. 22, 1996, which is hereby incorporated by reference.

BACKGROUND OF THE INVENTION

The present invention relates to an optical recording medium of a write once type and a method for writing and reading information on and from the recording medium, and more particularly to the medium which involves power calibration of a laser beam upon writing.

As a write once type optical recording medium, a CD-R (write once type CD) is known. In the CD-R, a laser beam is focused on a recording surface to convert luminous energy to thermal energy to change the physical nature of the recording surface. Thus, the information is recorded on the CD-R.

Although the recording mediums of the same type are made by the same material, the individual recording medium has not always the same characteristic. Accordingly, if a laser beam is set to a fixed power, information can not be recorded in an optimum condition. Therefore, in such a recording medium, before recording information, the laser power is adjusted by an optimum power control (OPC) to be set to an optimum value for a disc to be recorded.

A conventional OPC method employed in the CD-R will be described with reference to FIG. 7. The CD-R has a power calibration area (PCA) as a test area, lead-in area LI, information recording area DATA, and lead-out area LO. The PCA is provided on the inside of the lead-in area. A test writing is performed in the test area before recording information so as to obtain an optimum laser power for writing information on the CD-R.

Figure 6:
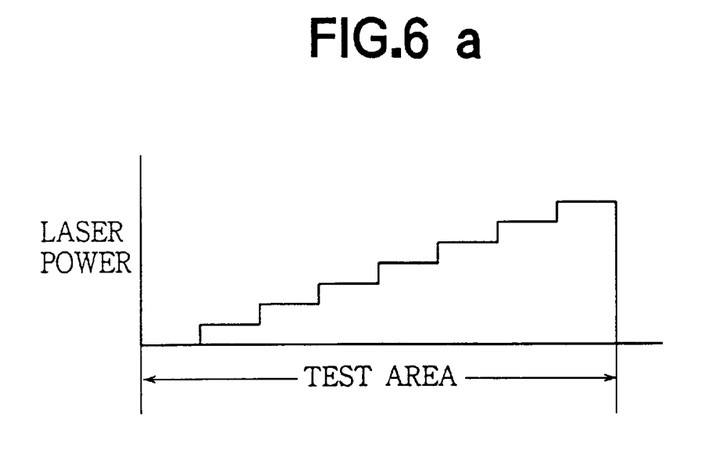
FIGS. 6a and 6b are charts each showing changing pattern of laser power of a test data.

More particularly, in order to determine the optimum laser power, in the PCA is recorded a test data, the power of which changes step by step within a predetermined range. When the test data is reproduced, the optimum recording power can be selected depending on the condition of the reproduced data. For example, as shown in FIG. 6a, an EFM pulse signal having a pulse width such as 3T and 11T is used to stepwisely change the power of the laser beam emitted from a pickup, thereby recording the test data. When the test data is reproduced, the frequency level and the reproduced waveform are checked to determine the optimum power.

The test data need not be confined to 3T and 11T data but may be other modulated data. The modulated data are recorded in the same format as the ordinary data.

In the write once type CD such as the CD-R, an area in which information has been written once is not used for further writing information again. A recorder for writing information is provided for controlling the laser power by the test writing in the PCA, and for recording information in the information recording area DATA thereafter with the controlled laser power.

Figure 7:
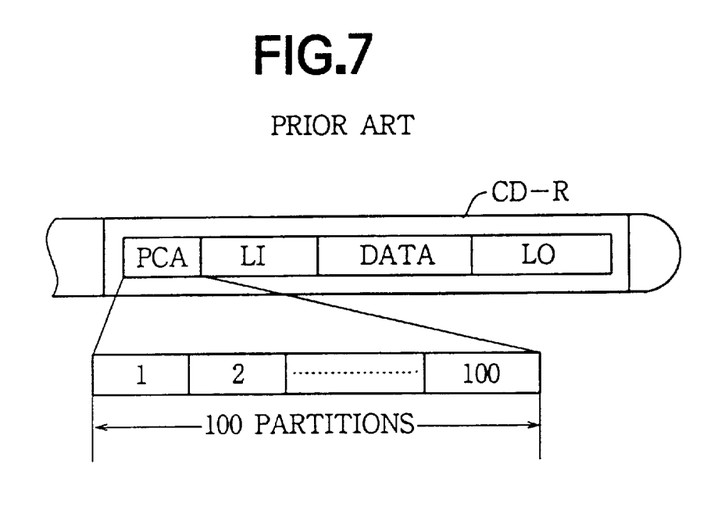
FIG. 7 is a diagram showing a conventional format for recording data on the writable disc.

As shown in FIG. 7, the PCA is divided into about a hundred partitions or blocks. Since one writing test uses one block, it is possible to perform a hundred times of the OPC.

However, the test writing over a hundred times can not be done. Therefore, even if a writable area (vacant space) remains in the information recording area, information can not be recorded therein.

Another drawback of the conventional recording method is caused by the fact that the characteristic of the recording layer is not even throughout the entire medium. In the conventional system, the PCA, wherein the test data is recorded, is inside the lead-in area LI so that the area is often distant from the information recording area DATA. The two areas may have rather different characteristics. Hence the determined laser power appropriate for the PCA may not always be appropriate for the recording area. In order to restrain the drawback, it is necessary to elaborately control the production of the recording layer at manufacturing thereof to render the characteristic of the layer even. Thus the manufacturing cost of the optical disc cannot be reduced.

In addition, it would be advantageous if the test data for power calibration, a procedure of which cannot be omitted at recording, is used to prevent illicit copying of data.

SUMMARY OF THE INVENTION

An object of the present invention is to provide an inexpensive write once optical recording medium and recording method thereof, wherein the number of recordings is increased.

Another object is to provide a method for recording data on the optical medium and reproducing the recorded data wherein illicit copying of data is prevented.

According to the present invention, there is provided an optical recording medium having a power calibration area for obtaining an optimum recording power and a first information recording area after the power calibration area, comprising, a test recording area, in which a test data is recorded, being provided after the first information recording area for obtaining an optimum recording power for recording information in a next information recording area. The test recording area is provided as an indication area for partitioning between information recorded areas.

The present invention further provides a method for recording information on an optical recording medium, comprising the steps of, providing a test recording area after a first information recording area, recording a test data in the test recording area, obtaining an optimum recording power by reproducing the test data recorded on the test recording area, recording information on a next information area after the test recording area with a light beam at the obtained optimum recording power.

The method further comprises setting the test recording area to an indication area for partitioning between information recording areas.

In an aspect of the present invention, the test data has a predetermined pattern.

The method further comprises comparing the reproduced test data with the predetermined pattern, disabling the step of recording information on the next information recording area when the reproduced test data does not coincide with the predetermined pattern.

These and other objects and features of the present invention will become more apparent from the following detailed description with reference to the accompanying drawings.

DETAILED DESCRIPTION OF THE PREFERRED EMBODIMENT

Figure 1:
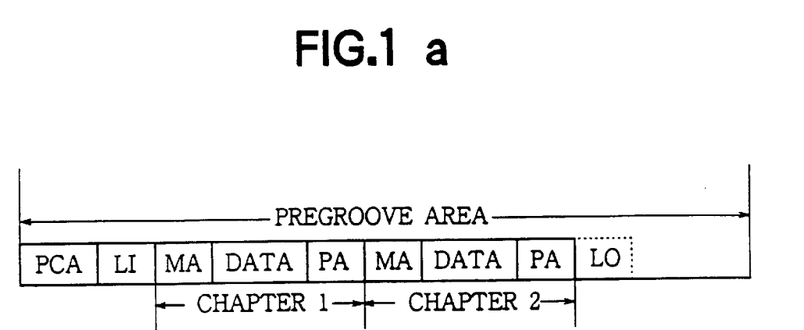
FIG. 1a is a diagram showing a format for recording data on the writable disc in accordance with the present invention.
FIG. 1b is a diagram showing a data format of the data recorded on the disc.

The principle of the present invention is described with reference to FIGS. 1a and 1b, showing the recording format according to the present invention, and a data format, respectively.

Referring to FIG. 1a, in an optical medium, hereinafter referred to as an optical disc, the power calibration area PCA, lead-in area LI and the lead-out area LO are formed as in the conventional format shown in FIG. 7. The power calibration area PCA of the present invention need not be divided into one hundred blocks. It suffices if only one block is provided to enable the calibration once. The lead-in area LI and lead-out area LO are provided before an information recording area DATA of a first recording area, which is herein referred to as a chapter, and after an information recording area of a last chapter where the last recording data for the disc are stored, respectively.

Each chapter is provided with a management information area MA in front of the area DATA for recording a management information, and a partition data area PA at the rear of the area DATA for indicating the last recording position.

The data recorded in each area is formatted as shown in FIG. 1b. Namely, a synchronizing signal SYNC and a sector number S# are written at every predetermined length of each data.

More particularly, at a first recording when a Chapter 1 is recorded, the test data for power calibration is recorded in the power calibration area PCA. The management information and the recording data are written, thereby forming the management area MA and the recording area DATA. Thereafter, the partition area PA of the Chapter 1 is formed by writing only the synchronizing signal SYNC and the sector number S#.

When recording Chapter 2, the management area MA of the Chapter 1 is read to obtain the address of the partition area PA in the Chapter 1. The partition area PA of the Chapter 1 is read to determine whether the test data is recorded therein. If the partition area PA is a blank, the test data for writing data in the Chapter 2 is recorded in the blank partition area PA of the Chapter 1 for determining the optimum laser power. Thereafter, the management information and the data are written in the areas MA and DATA of the Chapter 2, and the partition area PA is kept unwritten except for the synchronizing signal SYNC and the sector number S#. Hence, although the recording is repeated a number of times, the partition area of the last chapter is kept blank, so that the last recording position can be easily detected. When the recording is completed, a lead-out data is written in the lead-out area LO.

Figure 2:
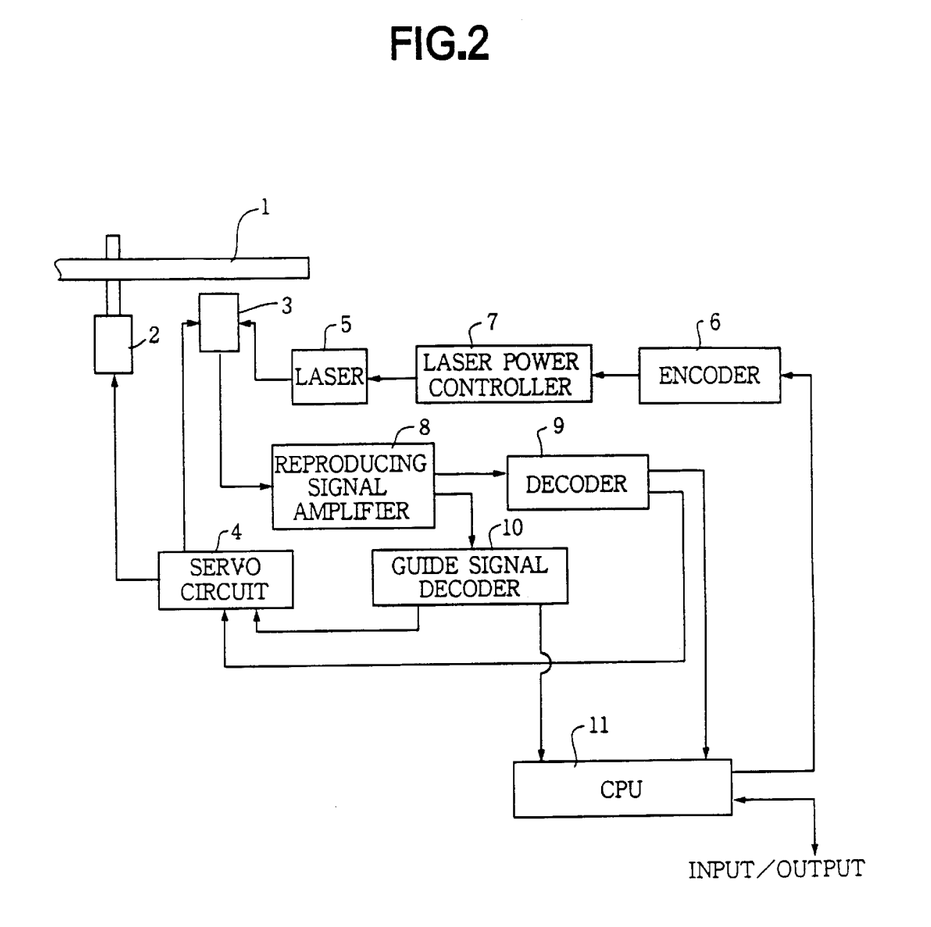
FIG. 2 is a block diagram of a system for recording and reading data on and from a writable optical disc according to the present invention.

A system for thus recording information on an optical disc and for reading the information is described hereinafter with reference to FIG. 2.

A recording data signal to be recorded on a writable optical disc (CD-R) 1 is applied to an encoder 6 through a CPU 11 in accordance with the operation of a user. The encoded signal is fed to a laser 5 so that the output thereof is modulated. A laser beam corresponding to the data signal is emitted from the laser 5 and transmitted through a pickup 3 so as to be focused on the optical disc 1 which is driven by a motor 2.

A laser power control circuit 7 is provided to control the power of the laser beam at the optimum level. Namely, a test data is recorded in the PCA or the partition areas PA. The reproduced test data is applied to a reproducing signal amplifier 8 through the pickup 3. The reproduced test data is decoded at a guide signal decoder 10 and fed to the CPU 11. The CPU 11 determines the optimum power applied at recording, and accordingly applies a power control signal to the laser power controller 7, thereby to control the power.

A reproduced data signal is read by the pickup 3 and applied to the reproducing signal amplifier 8. The reproduced signal is decoded at a decoder 9 and outputted through the CPU 11.

The reproduced signal from the amplifier 8 is applied to a servo circuit 4 through the guide signal decoder 10. The decoded reproduced data signal is also fed to the servo circuit 4. The servo circuit 4 controls the pickup 3 and the motor 2 in accordance with the reproduced signals, thereby operating a focus servo system, track-following servo system and the spindle servo system.

Figure 3:
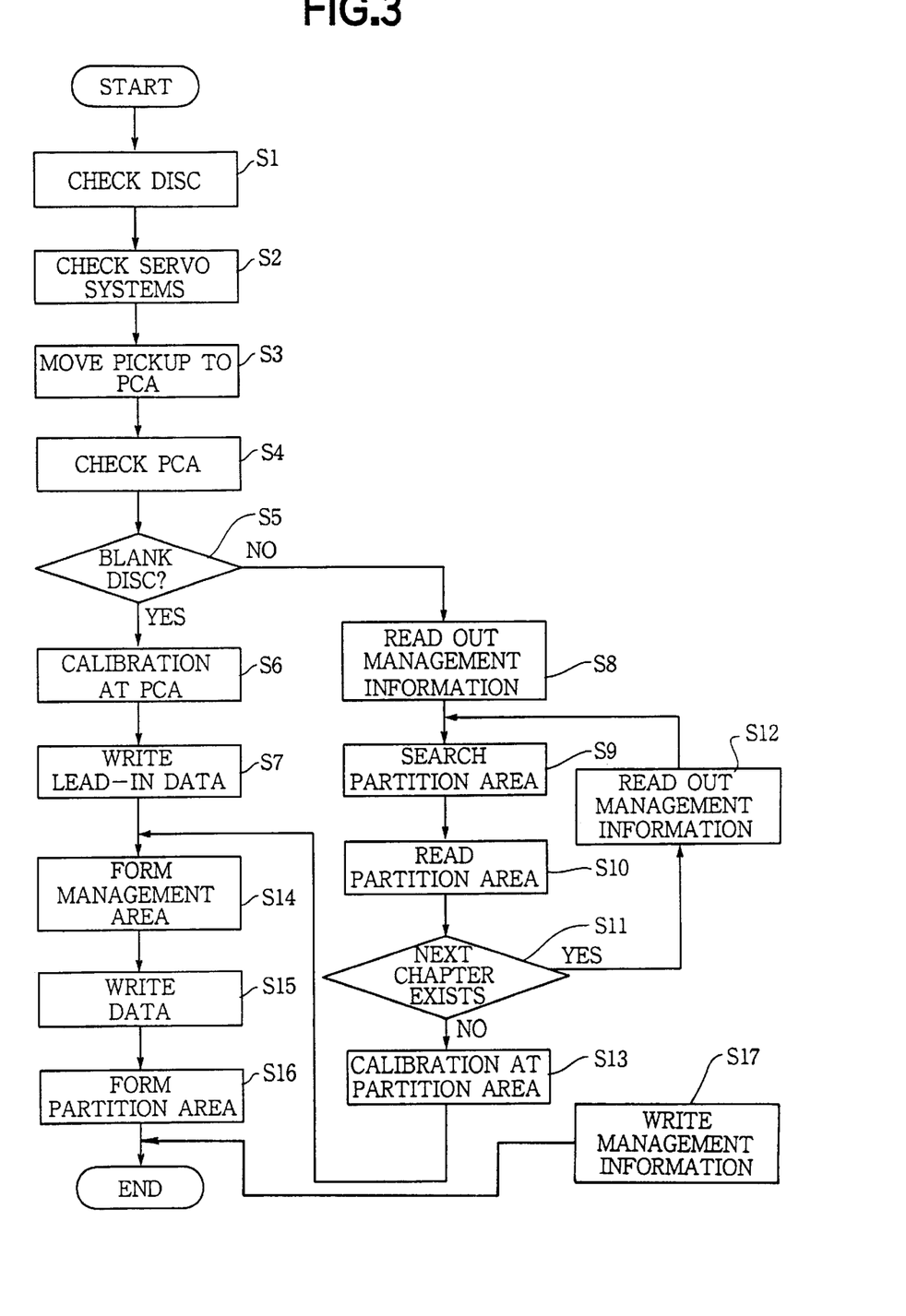
FIG. 3 is a flowchart describing the operation of the system of FIG. 2 when recording data.

The operation of the system when recording data on the disc 1 is described hereinafter with reference to the flowchart of FIG. 3.

At a step S1, it is confirmed that the disc 1 is set at the correct mounting position. Namely, the system is arranged such that if the disc is correctly set, the focusing operation can be performed. The position is confirmed by moving the pickup 3 to a predetermined radial position of the disc 1. Thereafter at a step S2, the motor 2 is operated to drive the disc 1, and at the same time, servo systems such as the focus servo system and the track-following system are checked to confirm whether they are normally operated for accurately recording and reading information.

At a step S3, the pickup 3 is moved to the power calibration area PCA of the disc 1 in accordance with the address information which is outputted from the guide signal decoder 10. At a step S4, the power calibration area PCA is checked. Namely, the strength of the laser beam emitted from the pickup 3 to the disc 1 is set to a small value for reproducing data. The reproducing signal amplifier 8 and the decoder 9 are operated so as to read out data in the power calibration area PCA while the servo circuit 4 is operated. Since the power calibration is necessarily executed before each recording, if data is already written in the Chapter 1, the test data is recorded in the power calibration area PCA. Thus, at a step S5, by reading the power calibration area PCA, it can be determined whether the disc 1 is a blank disc where data has never been recorded, or a disc is written at least on the Chapter 1.

When it is determined that the disc is a blank disc at the step S5, the program goes to a step S6 to carry out power calibration, the operation of which is already described hereinbefore with connection to the conventional recording method. Thereafter, at a step S7, the strength of the laser beam is set to the optimum power determined at the step S6, and the lead-in data is written, thereby to form the lead-in area LI.

At a step S14, the management area MA of the Chapter 1 is formed without writing information at this time.

Thereafter, the recording data is written in the data recording area DATA of the Chapter 1 at step S15.

At step S16, the partition area PA of the Chapter 1 is formed by writing the synchronizing signal SYNC and the sector number S#. Finally, the management information such as the directory of the data and the address of the corresponding partition area, that is the partition area PA of the Chapter 1, is recorded in the management area MA of the Chapter 1 at step S17.

If it is determined at the step S5 that data is already written on a part of the disc 1, the program goes to a step S8 where the management information of the Chapter 1 is read out. At a step S9, the pickup 3 is moved to the address of the partition area PA. The address is included in the management information obtained at the step SB. At a step S10, the partition area PA is read out.

At a step S11, when there is no test data recorded in the partition area PA, it means that the Chapter 1 is the last recorded area. Thereafter, the program proceeds to a step S13 where the test data for recording data in the Chapter 2 is recorded in the partition area PA of the Chapter 1.

When the test data is read out at the step S10, it means that other chapters are written subsequent to the Chapter 1. The program accordingly goes from the step S11 to a step S12 where the pickup 3 is moved to a management area MA of the next chapter, namely, Chapter 2. The management information of the Chapter 2 is read out from the management area MA to obtain the partition address of the Chapter 2. Thereafter, the steps S9 and S10 are carried out to read the partition area PA of the Chapter 2. Thereafter, the steps S9 and S10 are carried out to read the partition area PA of the Chapter 2. The steps S9 through S12 are repeated until the last written chapter is determined. After the last chapter is found at the step S11, the power calibration is performed at the step 13 using the blank partition area PA of the last recorded chapter.

Thereafter, the program goes to step S14 and S15 so that the management area MA is formed and the recording data is written in the recording area DATA, respectively. Furthermore, at steps S16 and S17, the partition area PA of the newly written chapter is formed and the address of the newly formed partition area PA is written in the management area MA.

Hence, in accordance with the present invention, the power calibration is carried out in a part of the disc adjacent the area where the recording data is to be actually written.

Figure 4:
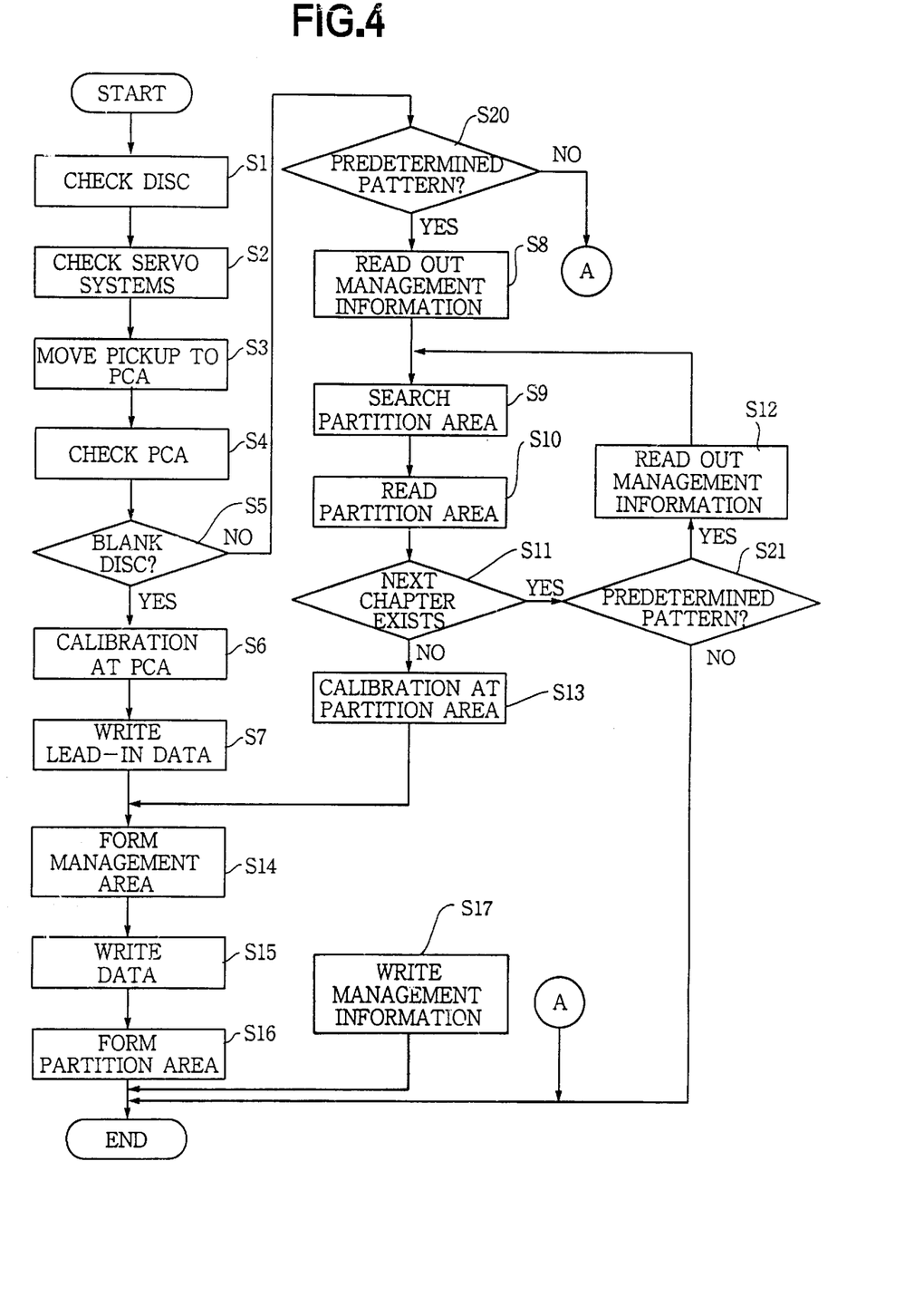
FIG. 4 is a flowchart describing a modified operation for recording data.

FIG. 4 shows a flowchart of the operation according to a modification of the present invention, wherein illicit copying of data can be prevented. The operation of FIG. 4 is similar to that shown in FIG. 3 so that the descriptions of the identical steps designated by the same numbers are omitted.

In accordance with the present modification, the test data recorded at the steps S6 and S13 for determining the optimum laser power has a predetermined special pattern as shown in FIG. 6b, for example. Namely, the power of the test data signal need not change stepwisely as shown in FIG. 6a, but can be set to any pattern without affecting the power calibration as long as a predetermined resolution is satisfied. The legitimacy of the recordings can be detected by comparing the power pattern of the recorded test data with the predetermined pattern.

More particularly, when it is detected at the step S5 that data is already recorded on the set disc, the program goes to a step S20 where the pattern of the test data read out from the power calibration area PCA at the step S4 is compared with the predetermined pattern. If the patterns coincide with each other, it means that the Chapter 1 is lawfully written on the disc using a legitimate recording device. Hence the program goes to the step S8 to execute further procedure for recording.

When the power pattern of the read out test data differs from the predetermined pattern, it means that the Chapter 1 was illicitly recorded. Hence the program is ended, thereby preventing further recording.

The test data recorded at other recordings are further checked. Namely, if there are other chapters recorded besides the Chapter 1, the program goes from the step S11 to a step S21 where the test data recorded in the partition area PA of the next chapter is checked. When the pattern of the test data coincides with the predetermined pattern, the program proceeds to the step S12. When the patterns do not coincide, the program is ended. Thus, the data cannot be recorded unless all of the chapters are recorded on a legitimate device, thereby preventing illicit copying of data.

The power pattern of the test data is determined by agreement between the copyright holder of the data and the manufacturer of the recording and reproducing devices.

Figure 5:
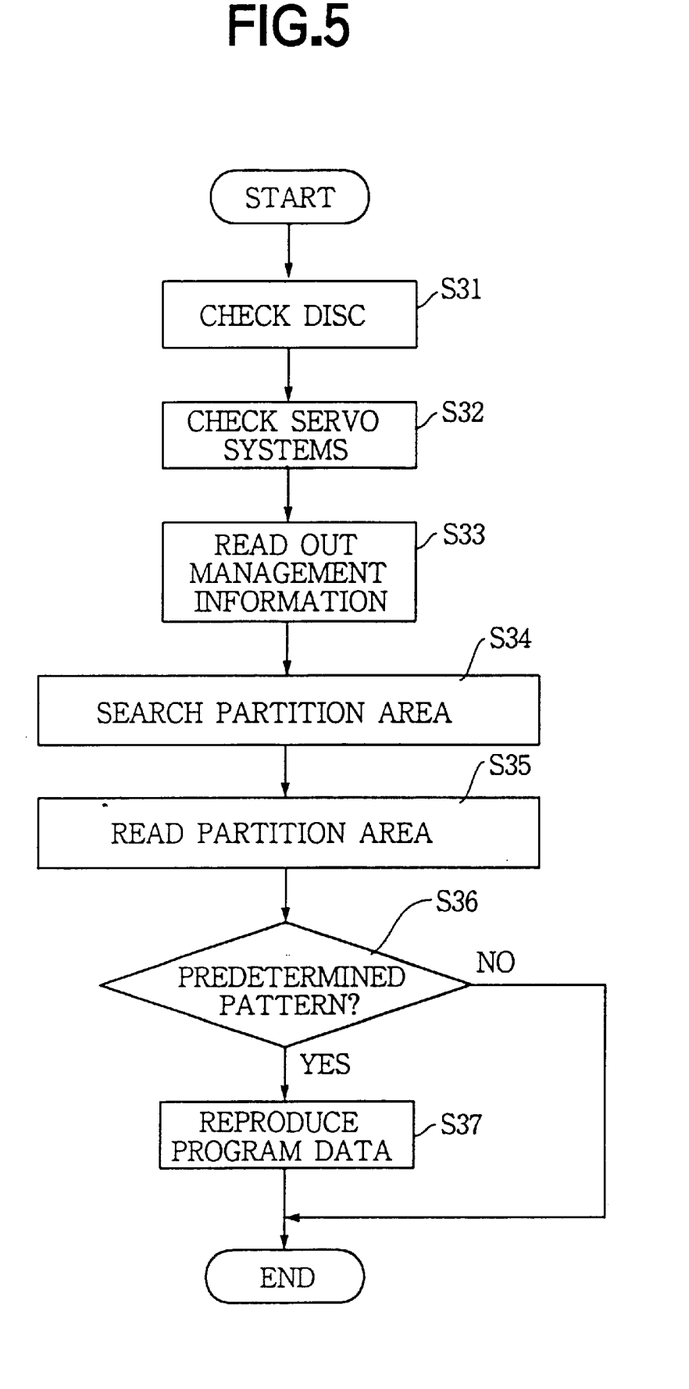
FIG. 5 is a flowchart describing the operation when reading out data recorded in accordance with the operation of FIG. 4.

FIG. 5 is a flowchart showing operation wherein illicitly recorded data cannot be reproduced.

Referring to FIG. 5, at a step S31, it is confirmed that the disc 1 is set at the correct position and at a step S32, the servo systems are also checked. Thereafter, at a step S33, the management information is read out from the management area of the Chapter 1, and at a step S34, the partition area PA thereof is searched dependent on the partition address included in the management information. Thereafter at a step S35, the test data is read out from the partition area PA.

When it is determined at a step S36 that the pattern of the read out test data coincides with the predetermined pattern, the program proceeds to a step S37 where the data recorded on the disc is reproduced. When the pattern of the read out test data does not coincide with the predetermined pattern, the program is ended at once.

The power pattern of the test data may be detected during the operations shown in FIGS. 4 and 5 in accordance with the change of the level of the reproduced RF signal. Alternatively, the change of integrated values of the reproduced signal may be detected. Furthermore, errors in the reproduced signal is counted to detect the change in the frequency of the errors.

In the case of an exclusive reproducing device for only reproducing data, the pickup is not capable of moving to the power calibration area, which is formed inside the lead-in area, so that the data in the power calibration area cannot be read out. However, in accordance with the present modification, the test data is recorded in the partition areas PA which is within the data recording area. Thus the test data can be reproduced.

The test data can be used for identifying other qualities of the data besides the legitimacy thereof.

The present invention can be applied to other type of optical recording medium such as a phase change disc.

From the foregoing it will be understood that in accordance with the present invention, the test data for determining optimum power is recorded in an area adjacent the actual recording area. Since the characteristics of the recording layers of both areas are similar, the optimum power for the recording area can be determined. Hence the forming of the recording layer need not be strictly controlled, thereby reducing the overall manufacturing cost of the optical disc. Moreover, the test data is recorded in the partition area for indicating the last recorded position and not in the power calibration area, the area of which is limited. Hence the data can be recorded as many times as needed without regard to the number of blocks in the power calibration area so that the entire recording area can be effectively used.

Moreover, in accordance with the present invention, the power of the legitimate test data for determining the optimum laser power is adapted to change depending on a predetermined pattern. When the reproduced test data does not coincide with the power pattern, showing that illicit recording was carried out on the disc, the recording operation or the reproducing operation is immediately stopped. Thus the illicit copying of data can be prevented.

What is claimed is:

1. A method for recording information on an optical recording medium, comprising the steps of:

(a) providing a first partition area after a first information recording area for partitioning the first information recording area and a next second information recording area;

(b) recording a test data in the first partition area;

(c) obtaining an optimum recording power by reproducing the test data recorded on the first partition area;

(d) recording information on the next second information recording area with a light beam at the obtained optimum recording power;

(e) providing a second partition area after the next second information recording area for partitioning the second information area and a next third information recording area; and repeating steps (a)–(e) for subsequent information areas.

2. The method according to claim 1, wherein the test data has a predetermined pattern.

3. The method according to claim 2, further comprising the steps of:

comparing the reproduced test data with a predetermined pattern; and disabling the step of recording information on the next information recording area when the reproduced test data does not coincide with the predetermined pattern.

4. The method according to claim 2, further comprising the steps of:

comparing the reproduced test data with a predetermined pattern; and disabling further recording operation when the reproduced test data does not coincide with the predetermined pattern.

5. The method according to claim 1 further comprising the steps of:

providing a management information recording area; and recording data indicating an address of the first test recording area in the management information recording area.

6. The method according to claim 5, wherein the management information recording area is provided in front of the first information recording area.

7. A method for recording information on an optical recording medium, comprising the steps of:

providing a partition area after a first information recording area for partitioning the first information recording area and a next information recording area;

recording a test data in the partition area;

obtaining an optimum recording power by reproducing the test data recorded on the partition area;

recording information on the next information recording area with a light beam at the obtained optimum recording power;

providing a management information recording area; and recording data indicating an address of the partition area in the management information recording area.

8. The method according to claim 7, wherein the management information recording area is provided in front of the first information recording area.

9. The method according to claim 7, further comprising the steps of:

comparing the reproduced test data with a predetermined pattern; and disabling the step of recording information on the next information recording area when the reproduced test data does not coincide with the predetermined pattern.

10. The method according to claim 7 further comprising the steps of:

comparing the reproduced test data with a predetermined pattern; and disabling further recording operation when the reproduced test data does not coincide with the predetermined pattern.

* * * * *